United States Patent [19]
Matsui

[11] Patent Number: 6,049,563
[45] Date of Patent: Apr. 11, 2000

[54] SPREAD SPECTRUM SIGNAL MULTIPLEXING SYSTEM EMPLOYING CHIRP SIGNALS

[75] Inventor: Hitoshi Matsui, Tokyo, Japan

[73] Assignee: NEC Corporation, Japan

[21] Appl. No.: 08/953,064

[22] Filed: Oct. 20, 1997

[30] Foreign Application Priority Data

Oct. 18, 1996 [JP] Japan .................................. 8-276669

[51] Int. Cl.[7] ...................................................... H04K 1/00
[52] U.S. Cl. ............................................ 375/204; 375/206
[58] Field of Search .................................. 375/204, 206, 375/348, 233

[56] References Cited

U.S. PATENT DOCUMENTS 4,748,639  5/1988  Feggeler ..................................... 375/58
5,113,278  5/1992  Degura et al. ........................... 359/154

*Primary Examiner*—Amanda T. Le
*Assistant Examiner*—Dac V. Ha
*Attorney, Agent, or Firm*—Ostrolen, Faber, Gerb & Soffen, LLP

[57] ABSTRACT

Multiplexing of signals with an application of a spread spectrum signal multiplexing system employing chirp signals is disclosed. A plurality of transmission signals are respectively time-shifted and synthesized. Then the synthesized signal is convoluted by a chirp signal from a chirp filter so as to generate a transmission signal. At a demodulation section, the multiplexed signal is time-divided due to being passed through an inverse-chirp filter. Then multipath distortion at a transmission channel is eliminated by a decision feed-back equalizer. From multiplexed signal from which the distortion is to be removed each of the signals is extracted respectively different timing data for each signal so as to output the signals as received data.

4 Claims, 9 Drawing Sheets

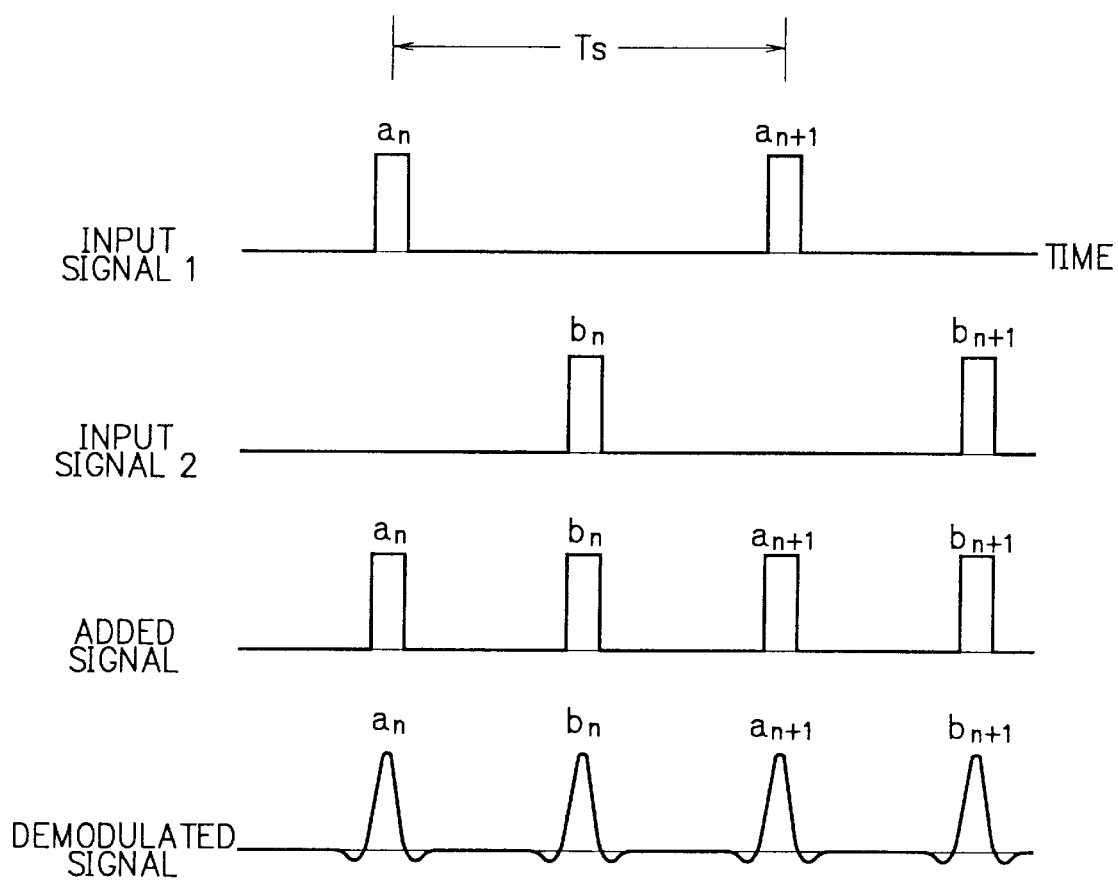

TIME

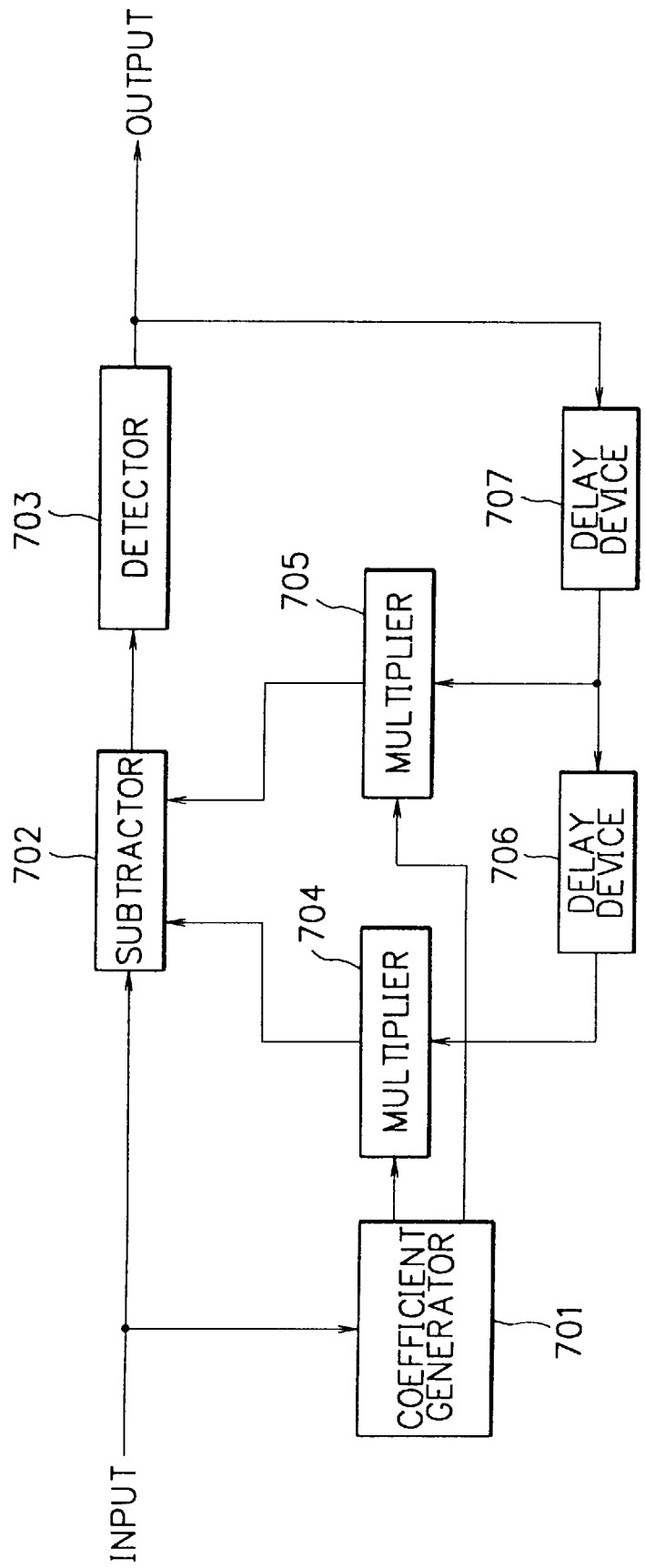

SPREAD SPECTRUM SIGNAL MULTIPLEXING SYSTEM EMPLOYING CHIRP SIGNALS

BACKGROUND OF THE INVENTION

The present invention relates to a signal multiplexing system employing spread spectrum, particularly to that using chirp signals as spread spectrum codes enabling the multiplexing of signals by time-shifting a plurality of signals.

Description of the Related Art

As to a conventional signal multiplexing method using spread spectrum, there has been disclosed in Japanese Patent Laid-Open 7-50649 a method where data codes are directly spread through the use of spread codes.

One example of configuration concerning the conventional signal multiplexing system will be given with reference to FIG. 1. In this figure, a multiplex number is set to 2, and a symbol interval of a data code is set to Ts. A transmission code is generated by a data code generator 202. This transmission code is to be convoluted at a spreader 204 by a spread code outputted from a spread code generator 205. On the other hand, an output signal from a data code generator 201 is also spread due to being convoluted by the spread code outputted from the spread code generator 205. In this case, however, if the output signal from the data code generator 201 is spread as it is, it would be difficult to differentiate it from the output signal of the spreader 204 which leads to an impossibility of separation of the signal at a receiving side. Accordingly, a spread code, which is substantially the output signal of the spread code generator 205 being delayed by an interval of Ts/2 at a delay circuit 206, is arranged to be inputted to a spreader 203. The output signals from the spreader 203 and the spreader 204 are added together at an adder 207 to be outputted as a single signal. Then the outputted signal is modulated and altered at a modulator 208 so as to become of a signal form suitable for easy transmission.

Meanwhile, on the receiving side, the received signal is inputted to a despread filter 210. The operation at the despread filter 210 is realized by executing correlation operation with the received signal and a code identical to that generated from the spread code generator 205. Output signals of the despread filter 210 are two separated signals each of which being shifted by an interval of Ts/2. Therefore, one signal is to be sampled by a sampling device 212, and the other signal is once delayed by an interval of Ts/2 at a delay circuit 211 to be sampled by a sampling device 213 which is substantially the same as the sampling device 212. Thus, as being described above, due to having signals being multiplexed by shifting the timing of the spread codes, higher-speed signal transmission is made possible within the same frequency bandwidth.

The conventional system being described above has the following problems. Generally, the signal multiplexing method adopts a direct spread spectrum method where spread codes are applied. According to the conventional method, the chip rate of the spread code is more than 10 times faster than the symbol rate of the data code which leads to a considerable acceleration of an operation speed of the spreader. The high-speed operation of the spreader might give rise to problems concerning the operation speed and power dissipation of the elements. The reason for these particular problems is that for a portable terminal which is designed to use batteries as its power source, it is difficult to adopt a communication method where power dissipation is large.

Furthermore, while there are multipath distortion in the transmission channel, the signal multiplexing method employing the direct spread spectrum can not ignore the correlation distortion among the spread spectrum codes which leads to difficulty in transmitting.

SUMMARY OF THE INVENTION

It is therefore an object of the present invention to build an overall superior signal transmission system to be achieved under the same environment as the portable terminal where miniaturization, lightening and less power dissipation are the main concern rather than minor deterioration in transmission ability.

According to one aspect of the present invention, there is provided a spread spectrum signal multiplexing system for multiplexing signals with an application of a spread spectrum including a transmission means and a receiving means, the transmission means comprising: a first synthetic means for time-dividing transmission data to a total of N transmission signals, where N is an integer over 2, so as to time-shift and synthesize each of the signals to output a synthesized output signal; a chirp filter responsive to the above synthesized output signal transmitting a spread spectrum signal obtained by an execution of a convolutional operation by a chirp signal on the synthesized output signal; and a modulator responsive to the spread spectrum signal modulating the signal so as to output the modulated signal; and the receiving means comprising: an inverse-chirp filter responsive to a demodulated received signal transmitting a despread spectrum signal obtained by the execution of a convolutional operation on the demodulated received signal by an inverse-chirp signal having an inverse characteristic to the chirp signal; a decision feed-back equalizer having distortion of a transmission channel being eliminated responsive to the despread signal transmitting a total of N signals; and a second synthetic means for extracting from the decision feed-back equalizer a total of N signals with respective timing and synthesize the signals to output a synthesized signal as received data.

Regarding a second aspect of the present invention, there is provided a spread spectrum signal multiplexing system according to the first aspect of the present invention wherein: the first synthetic means includes a divider for time-dividing the transmission data into a total of N transmission signals, where N is an integer over 2, a delay device for delaying a total of (N−1) signals out of a total of N output signals of the divider respectively with different delay time, and an adder for adding a total of (N−1) signals of the delay device together with one of the output signals of the divider; and the second synthetic means includes an adder for synthesizing a total of N signals from the decision feed-back equalizer.

With respect to a third aspect of the present invention, there is provided a spread spectrum signal multiplexing system according to the first or the second aspect of the present invention wherein the decision feed-back equalizer which includes a coefficient generator for taking out cancelled components from input signals so as to transmit the cancelled component, a subtracter responsive to the input signals and the cancelled components transmitting among the input signals the signals having only the cancelled components removed, and a detector responsive to the signals with the cancelled components being removed determining whether the cancelled components are really being eliminated so as to output the signals with the cancelled components being removed as recovered data only when it is determined that the cancelled components are truly excluded from the signals.

According to the spread spectrum of the present invention, chirp signals are applied to the method of code multiplexing. For the chirp signals can be realized through a simple analog circuit as a surface acoustic wave (SAW) filter, there is no need for a complex circuit like the one for direct spread spectrum employing spread signals. Furthermore, multipath distortion generated by a transmission channel causing interference among a total of N signals can be removed through an adoption of a decision feed-back equalizer. Therefore, it is possible to avoid deterioration of transmission quality caused by the multipath distortion even when code-multiplexing is being conducted.

The above and further objects and the novel feature of the invention will more fully appear from the following detailed description when the same is read in connection with the accompanying drawings. It is to be expressly understood, however, that the drawings are for illustration only and are not intended as a definition of the limits of the invention.

BRIEF DESCRIPTION OF THE DRAWINGS

FIG. 5 is a diagram showing a multiplexing with respect to a time axis;

FIG. 7 is a structural diagram showing a decision feed-back equalizer of the present invention;

DESCRIPTION OF THE PREFERRED EMBODIMENTS

Figure 1:
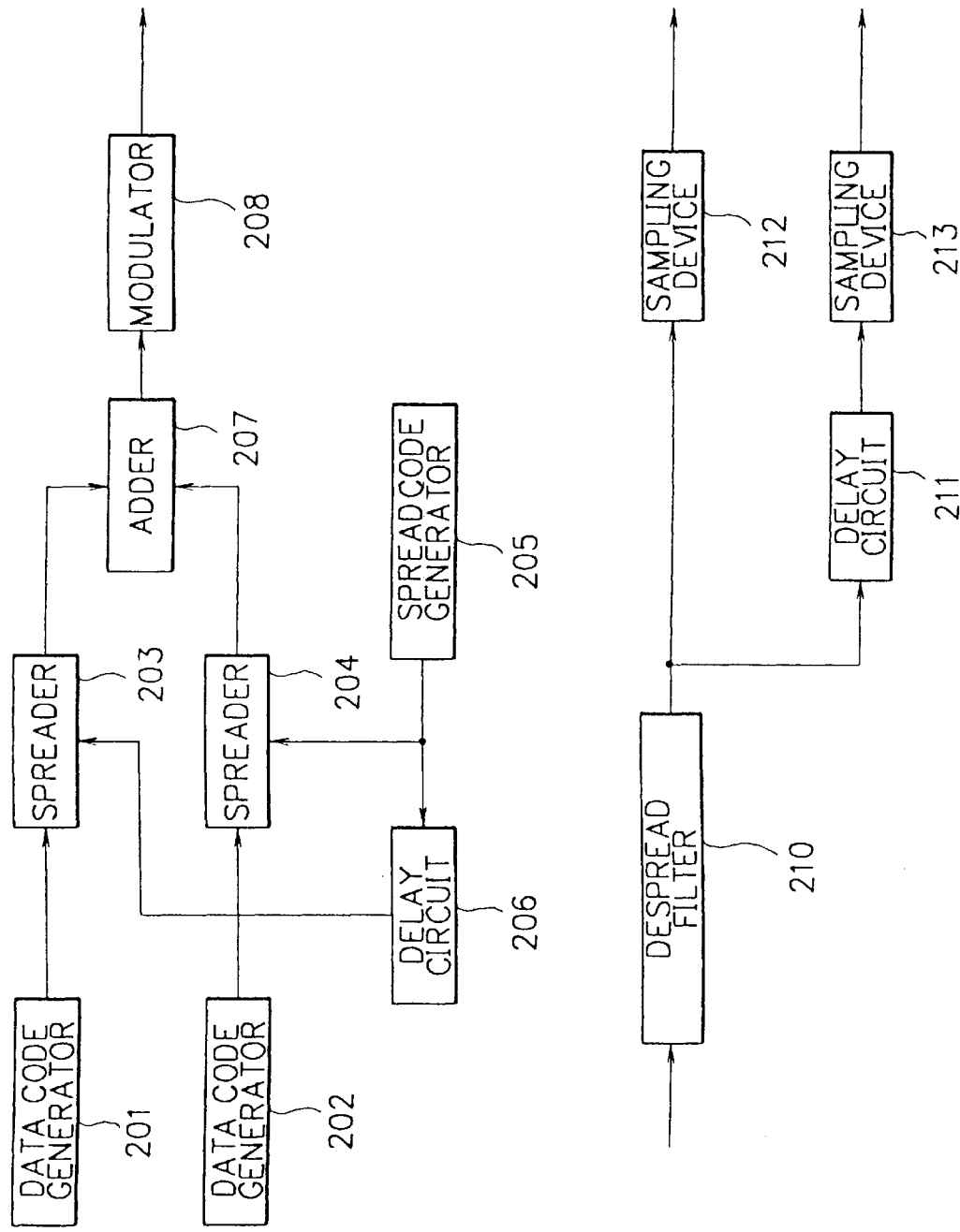
FIG. 1 is a structural diagram showing one embodiment of a conventional signal multiplexing system.

Referring now to the drawings, a spread spectrum multiplexing system of the present invention will become apparent from the following description of the preferred embodiment of the invention.

Figure 2:
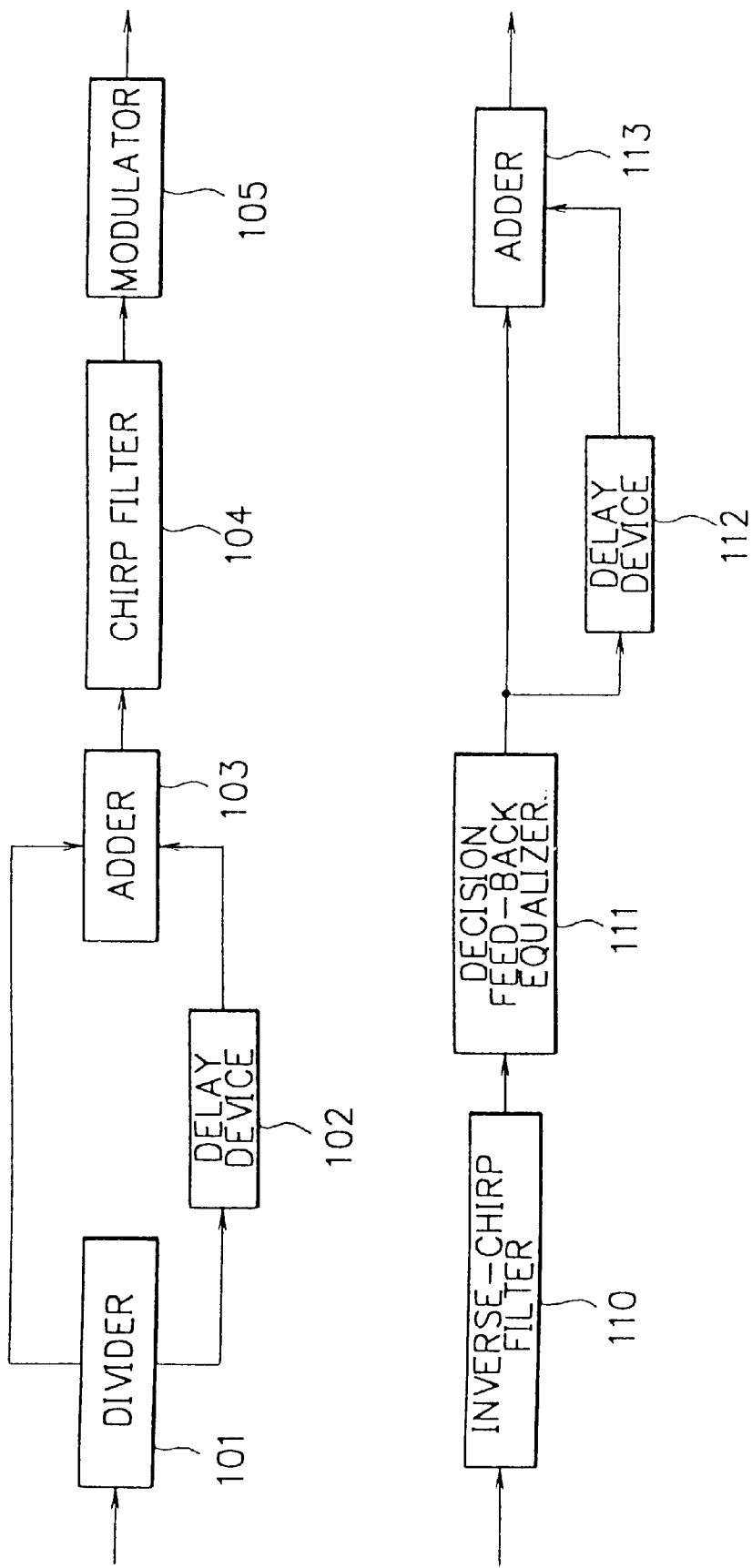
FIG. 2 is a structural diagram showing one embodiment of the present invention.

A description of one embodiment of the present invention will now be given with reference to FIG. 2. FIG. 2 is a structural diagram of the corresponding embodiment. Here a multiplex number is set to 2.

The transmission data having a symbol interval Ts/2 is inputted to a divider 101 where it is divided into two signals. The symbol interval for each of the divided signals is Ts. One output from the divider 101 is to be directly inputted to an adder 103. The other output is to be inputted to a delay device 102 to be delayed by an interval of Ts/2 before being inputted to the adder 103. Then the signal being synthesized at the adder 103 is to be inputted to a chirp filter 104 where a convolutional operation, that is the spread spectrum, is being carried out by a chirp signal. The output signal of the chirp filter 104 is to be modulated at a modulator 105 to be altered into a signal form fitted for easy transmission.

In the meantime, the received signal on the receiving side is filter-processed, in other words, converted to a despread spectrum signal at an inverse-chirp filter 110 having the inverse characteristic to the chirp filter 104. To the output of the inverse-chirp filter 110, two signals are multiplexed by a shift of Ts/2. However, for those signals containing multipath distortion due to multiplex propagation generated in the transmission channel, they are to first have the delayed components eliminated at a decision feed-back equalizer 111. Then, the multiplexed signal is conducted to a delay device 112 and an adder 113 in which an inverse operation to that of the divider 101 of the transmission side is performed so as to output from the adder 113 a signal recovered to a state when being inputted to the divider 101 of the transmission side.

Figure 3A:
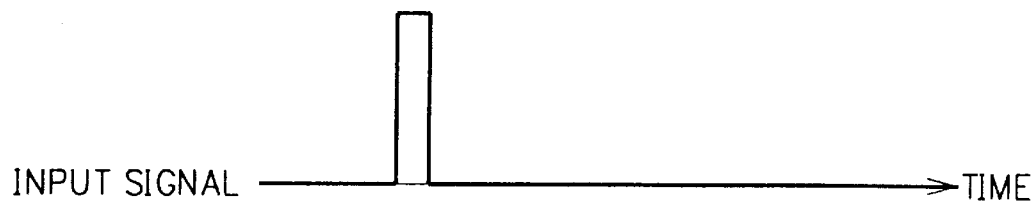
FIGS. 3A and 3B and 3C are diagrams showing time and frequency characteristics.
Figure 3B:
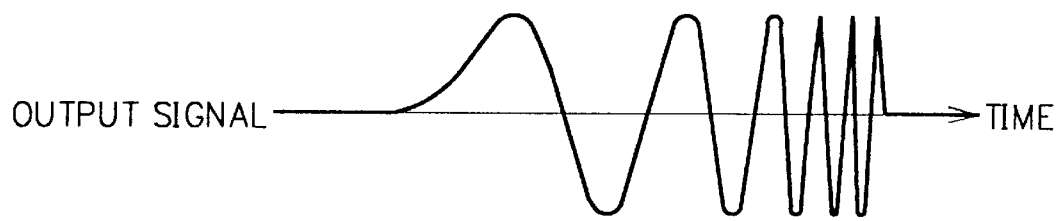
Figure 3C:
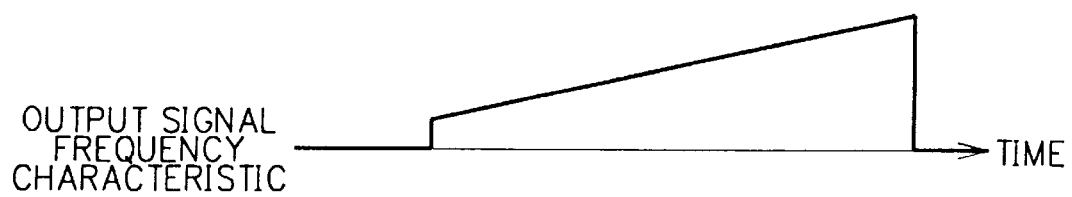

Next, an operation of the present embodiment will be described in detail. As it is shown in FIG. 3B, the chirp signal being applied to the present invention is a signal of which frequency of a sine wave is increased proportionally to the passing of time. FIG. 3C indicates that the frequency of the sine wave is increased proportionally to the passing of time. Thus, the chirp filter 104 specified in FIG. 2 has to have a characteristic that a waveform like the one indicated in FIG. 3B is outputted when an impulse such as the one shown in FIG. 3A is inputted thereto.

Figure 4A:
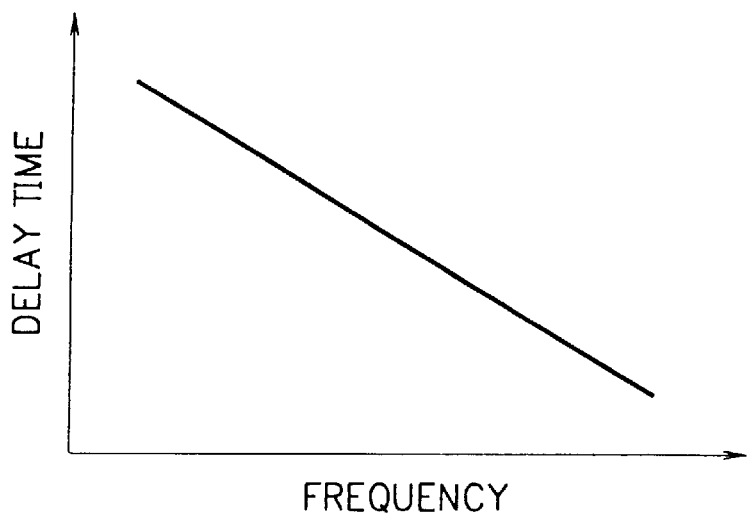
FIGS. 4A and 4B and 4C are diagrams showing time and frequency characteristics of the inverse-chirp filter.
Figure 4B:
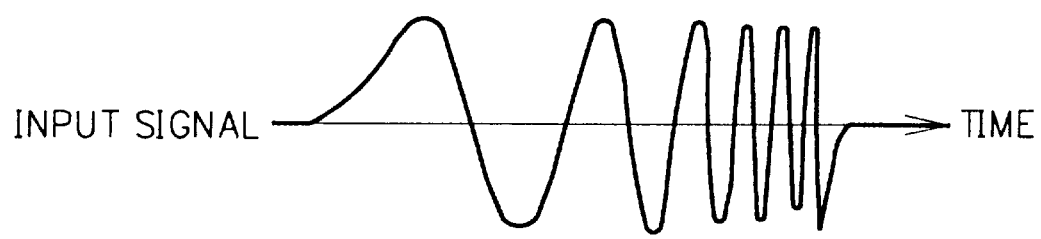
Figure 4C:

When the chirp signal passes through a filter as indicated in FIG. 4A, that is, a filter in which amplitude feature does not change when the frequency gets larger but the amount of delay time decreases, the low-frequency component at the front edge of the chirp signal is to be outputted with a large delay, while the high-frequency component at the terminal edge of the signal is outputted with a small delay. Therefore, as it is shown in FIG. 4B, the time-expanded chirp signal is compressed to be outputted with a state of impulse as shown in FIG. 4C.

FIG. 5 show the state of multiplexing when double multiplexing of the signal is conducted with the use of the chirp signals. An input signal 1 which is of a signal system of the symbol interval Ts and an input signal 2 which is of another signal system are shifted by an interval of Ts/2 and are added together to be spread with the application of the chirp signals. Here, as the chirp signal of the input signal 1 and the chirp signal of the input signal 2 overlap each other in time, leading to a state of intersymbol interference. However, by conducting the spread spectrum with the use of the inverse-chirp filter 110, the demodulation signal is capable of having the multiplexed signal separated as shown in FIG. 5.

Figure 6A:
FIGS. 6A and 6B and 6C and 6D are diagrams showing a received signal being under the influence of a multipath distortion.
Figure 6B:
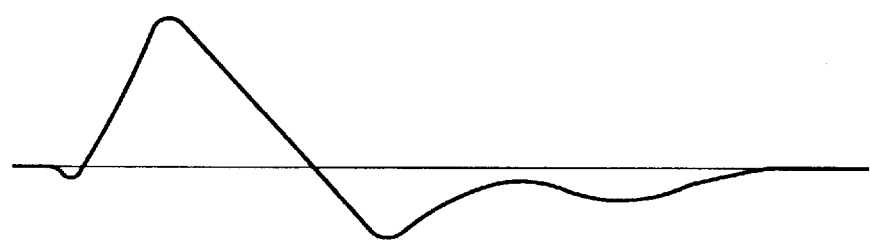
Figure 6C:
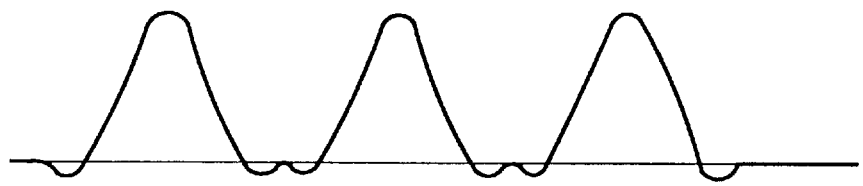
Figure 6D:
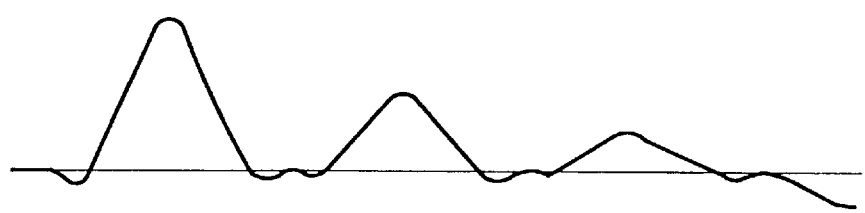
Figure 8A:
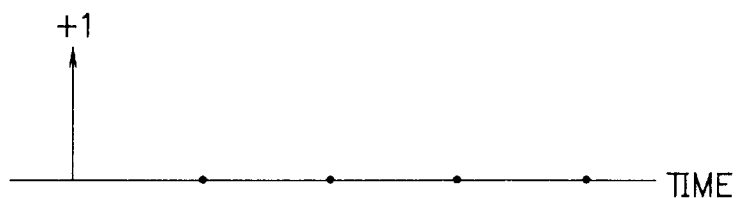
FIGS. 8A and 8B and 8c and 8D are diagrams showing a signal in the state before being influenced by the multipath distortion, the signal in the state after being influenced by the multipath distortion, and the signal in the state after being equalized.
Figure 8B:
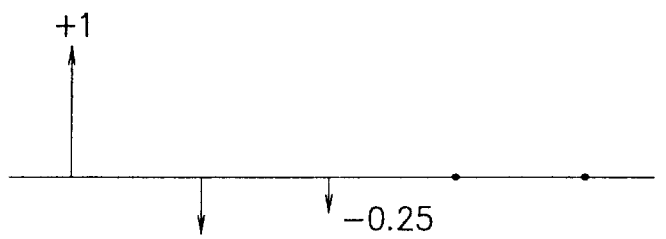

However, when there exists multipath distortion in the transmission channel due to the multiplex propagation, the spectrum-diffused signals are time-expanded which results in a condition where the signals interfere with one other. This phenomenon is shown in FIG. 6. FIG. 6A indicates a waveform of a single wave where there is no multipath distortion, after being despreaded. When there is a multipath distortion, the waveform becomes a time-expanded waveform as shown in FIG. 6B. As for a signal being multiplexed, the waveform is well-regulated as shown in FIG. 6C when there is no multipath distortion. On the other hand, the waveform becomes the one shown in FIG. 6D when there is a multipath distortion, which indicates that it is impossible to correctly recover the transmission data. Accordingly, a delay wave caused by the multipath is eliminated by utilizing the decision feed-back equalizer 111. The principle of elimination is as follows. As it is shown in FIG. 8, by transmitting a single wave shown in FIG. 8A, the decision feed-back equalizer 111 receives as input the signals shown in FIG. 8B. Then the decision feed-back equalizer 111 eliminates the signals of levels −0.5 and −0.25 by employing a head signal of a level of +1. Consequently, upon receiving signals like the ones shown in FIG. 8C, there is outputted signals as shown in FIG. 8D from the decision feed-back equalizer 111.

Next, an example of the embodiment of the present invention will be described with reference to FIG. 2. According to FIG. 2, there is employed a SAW filter for the chirp filter 104 which enables an impulse response to become a chirp signal. Likewise, the inverse-chirp filter can also be realized by applying the SAW filter. The divider 101, the delay device 102, the adder 103. the decision feed-back equalizer 111, the delay device 112 and the adder 113 can be actualized by a digital logic circuit functioning with an operation speed similar in the extent to the symbol rate of the transmission data. Consequently, there is no need for conducting a logical operation with a speed more than ten times faster than the symbol rate as in the case of the direct spread spectrum employing the spread codes. As a result, there can be realized a low-speed circuit, that is, a circuit with less power dissipation.

Figure 9:
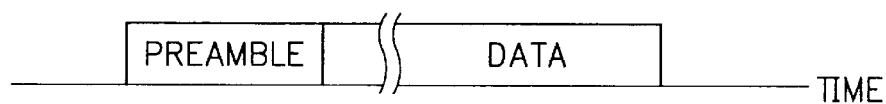
FIG. 9 is a structural diagram showing a burst signal having a preamble added in order to determine a coefficient at a multiplier of a decision feed-back equalizer.
Figure 10:
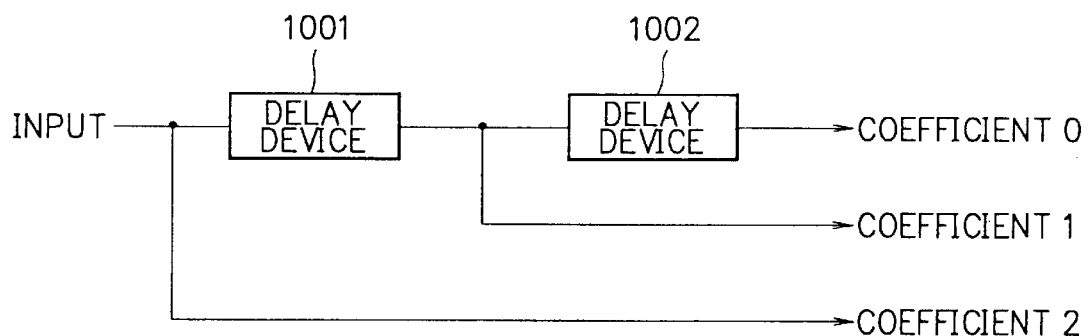
FIG. 10 is a structural diagram showing a coefficient generator of the decision feed-back equalizer.

The decision feed-back equalizer 111 has a configuration as shown in FIG. 7. A coefficient generator 701 extracts the cancelled components −0.5 and −0.25 shown in FIG. 8B from the input signal to have them supplied to multipliers 704 and 705. In realizing the coefficient generator 701. first of all, the transmission side transmits a preamble as shown in FIG. 9 before sending the data system. The preamble sends repetitions of a single wave as shown in FIG. 8A. Then, the decision feed-back equalizer 111 receives a repetition of signals as shown in FIG. 8B. When the repeating signals are inputted to the circuit as shown in FIG. 10, there are outputted +1 for the coefficient 0, −0.5 for the coefficient 1 and −0.25 for the coefficient 2, all of them at the same time. The coefficient 1 is supplied to the multiplier 705, and the coefficient 2 is supplied to the multiplier 704. The coefficient 0 is outputted to the exterior as a signal for adjusting the level of the input signal.

After the coefficient is obtained by the coefficient generator 701, a delayed component is eliminated by a subtracter 702. The signal having the delayed component removed is analyzed to determine which one of +1 and −1 at a detector 703 is to be output as recovered data, and at the same time is supplied to a delay device 707 in order to remove the delayed component from the following input signal.

Figure 8C:
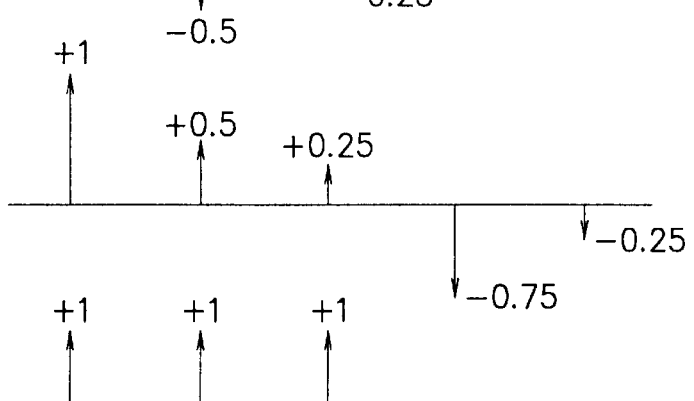
Figure 8D:
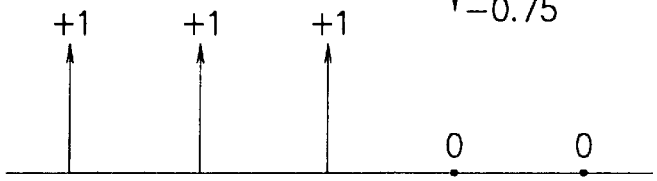

Based on the above principle, when the decision feedback equalizer 111 receives signals like the ones shown in FIG. 8C, the delayed components of the signals are eliminated one after another which results in obtaining correct data from the detector 703 as shown in FIG. 8B.

According to the present invention, there is no part which generally operates with a chip rate having a speed more than 10 times faster than that of the data symbol rate. Consequently, there is no need for adopting a high-speed element which is comparatively expensive. Moreover, since a low-speed operation is made possible, the power dissipation can be kept small. Therefore, under the situation such as desired for the portable terminal in which lightening and less power dissipation is the most concern, the effect of the present invention becomes valid.

Furthermore, in accordance with the present invention, even though the transmission channel has multipath distortion, the signals can have the delayed components removed by employing the decision feed-back equalizer. Hence, there should be no concern for the deterioration of transmission ability even when the multiplexing is conducted. Accordingly, higher-speed transmission is made possible under the same propagation condition as that of the conventional system.

While preferred embodiments of the invention have been described using specific terms, such description is for illustrative purposes only, and it is to be understood that changes and variations may be made without departing from the spirit or the scope of the following claims.

What is claimed is:

1. A spread spectrum signal multiplexing system for multiplexing signals with an application of a spread spectrum, the system comprising a transmission means and a receiving means, wherein the transmission means comprises:
a first synthetic means for time-dividing transmission data to a total of N transmission signals, where N is an integer over 2, so as to time-shift and synthesize each of the signals to output a synthesized output signal;
a chirp filter, responsive to the synthesized output signal, for transmitting a spread spectrum signal obtained by executing a convolutional operation with a chirp signal on the synthesized output signal; and
a modulator, responsive to the spread spectrum signal, for modulating the spread spectrum signal so as to output a modulated signal; and the receiving means comprises:
an inverse-chirp filter, responsive to a demodulated received signal, for transmitting a despread-spectrum signal obtained by executing a convolutional operation on the demodulated received signal using an inverse-chip having a characteristic inverse to that of the chirp signal;
a decision feed-back equalizer for removing distortion of a transmission channel in response to the despread-spectrum signal, and then transmitting a total of N signals; and
a second synthetic means for receiving from the decision feed-back equalizer a total of N signals along with respective timing data for each of the N signals and synthesizing the N signals to output a synthesized signal as received data.

2. A spread spectrum signal multiplexing system according to claim 1, wherein:

the first synthetic means includes
a divider for time-dividing the transmission data into a total of N transmission signals, where N is an integer over 2,
a delay device for delaying a total of (N−1) signals of the N transmission signals output from the divider along with a respectively different delay time for each of the (N−1) signals, and
an adder for adding the (N−1) signals output from the delay device together with the one of the N transmission signals output from the divider not delayed by the delay device; and the second synthetic means includes an adder for synthesizing the N signals output from the decision feed-back equalizer.

3. A spread spectrum signal multiplexing system according to claim 1, wherein:

the decision feed-back equalizer includes
- a coefficient generator for taking out cancelled components from inputted signals so as to transmit the cancelled components,
- a subtractor, responsive to the inputted signals and the cancelled components, for transmitting a set of signals from among the inputted signals having only the cancelled components removed, and
- a detector, responsive to the set of signals having the cancelled components removed, for determining whether the cancelled components are really being eliminated so as to output the set of signals having the cancelled components removed only when it is determined that the cancelled components are truly being excluded from the signals.

4. A spread spectrum signal multiplexing system according to claim 2, wherein:

the decision feed-back equalizer includes
- a coefficient generator for taking out cancelled components from inputted signals so as to transmit the cancelled components,
- a subtractor, responsive to the inputted signals and the cancelled components, for transmitting a set of signals from among the inputted signals having only the cancelled components removed, and
- a detector, responsive to the set of signals having the cancelled components removed, for determining whether the cancelled components are really being eliminated so as to output the set of signals having the cancelled components removed only when it is determined that the cancelled components are truly being excluded from the signals.

* * * * *